April 19, 1966  C. C. BOOKOUT ETAL  3,246,465
CONTROL SYSTEM FOR A HYDROSTATIC TRANSMISSION
Filed Feb. 20, 1964  2 Sheets-Sheet 1

CHARLES C. BOOKOUT
PAUL E. TAYLOR
INVENTORS

BY John R. Faulkner
Robert E. McCollum
ATTORNEYS

FIG. 2

United States Patent Office 3,246,465
Patented Apr. 19, 1966

3,246,465
CONTROL SYSTEM FOR A HYDROSTATIC
TRANSMISSION
Charles C. Bookout and Paul E. Taylor, Livonia, Mich.,
assignors to Ford Motor Company, Dearborn, Mich.,
a corporation of Delaware
Filed Feb. 20, 1964, Ser. No. 346,313
15 Claims. (Cl. 60—19)

This invention relates to a control system for a motor vehicle type hydrostatic transmission. More particularly, the invention relates to a control system establishing a constant torque setting of a hydrostatic motor below a predetermined speed of the transmission output shaft, and subsequently automatically varying the torque setting to provide a constant output horsepower during the continued operation of the transmission.

The invention is particularly adapted for use with off-the-road, heavy-duty type vehicles, although it is not limited to this type. These vehicles generally are front wheel driven, with an engine and transmission package adjacent the front wheels. An auxiliary power unit sometimes is provided adjacent the rear wheels to drive the vehicle in the event the front wheels become mired in mud or float due to other conditions.

The invention is directed to a fluid pressure control system for a hydrostatic transmission to be used with this auxiliary power unit; however, it will be clear that it would have use with any hydrostatic transmission in which the particular objectives to be described are desired.

One of the objects of the invention, therefore, is to provide a control system for a hydrostatic type transmission that maintains a constant torque setting for the motor unit below a predetermined vehicle speed, and automatically varies this torque setting thereafter to provide a constant horsepower to the output shaft.

Another object of the invention is to control the hydrostatic circuit pressure as a function either of engine speed or the position of the accelerator pedal controlling the motor vehicle engine. The first prevents an overload of the engine at low engine speeds, while the latter schedules the torque setting of the motor in accordance with the system pressure as determined by the setting of the throttle pedal. The torque setting of the motor, therefore, is proportional to the torque demand, as indicated by the degree of depression of the throttle pedal and engine speed. The over-all circuit pressure is controlled by which ever control is establishing the lowest pressure.

A further object of the invention is to provide a hydrostatic transmission control system controlling the fluid displacement of the motor unit as a function of the flow or pressure drop across an orifice in the high pressure supply line to the motor, so that the motor unit always is providing its most efficient operation.

A still further object of the invention is to provide such a control system with a plurality of safety devices to prevent damage to the transmission during unusual and undesirable operating conditions.

Another object of the invention is to provide a hydrostatic transmission with a control system providing selective activation of the transmission, and automatic termination of operation when the vehicle speed reaches a predetermined point or the transmission begins to operate in an unsafe condition. In installations such as described, the auxiliary transmission, containing the hydrostatic pump and motor units, operates only temporarily, and only until the main power unit again is capable of taking over the drive of the vehicle. It will be seen, therefore, that the selective operation of the control system, and its automatic termination, satisfies the requirement for a short phase of operation.

A still further object of the invention is to provide a hydrostatic transmission control system that is simple in design, makes use of readily available parts, and once activated, is controlled automatically upon the actuation of a single control member, such as the engine throttle pedal.

Other objects, features, and advantages of the invention will become apparent upon reference to the succeeding, detailed description thereof, and to the drawings illustrating the preferred embodiment thereof; wherein.

Figure 1:
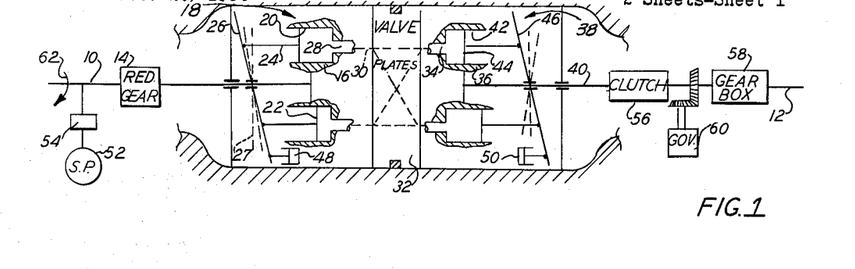
FIGURE 1 is a schematic cross section of a typical hydrostatic transmission to be controlled by the system constructed according to the invention.

FIGURE 1 shows a hydrostatic type transmission providing an infinitely variable speed drive between an input shaft 10 and a power output shaft 12. Shaft 10 is driven by any suitable source of power, such as, for example, the internal combustion engine for a motor vehicle. This shaft is drivably connected through suitable reduction gearing 14 to the cylinder block 16 of a known type of variable displacement, pressure compensated, hydraulic pump 18. The pressure compensating feature will be described upon a consideration of the control system of FIGURE 2. The block 16 has a number of circumferentially spaced cylinders 20, each slidably containing a piston 22. The piston rods 24 are of equal length, and are adapted to slidably bear against a non-rotating but tiltable swash plate 26. The swash plate is pivotally mounted about a stationary point (not shown) in the transmission housing. It moves progressively between a vertical non-pumping position to inclined positions to vary the displacement of the pump unit in a known manner. For example, when the swash plate is in the full line inclined position shown, the volumetric output of the pump will be at a maximum, while the pressure is at a minimum. The plate may be pivoted progressively to the dotted line positions to decrease the displacement of the pump, while increasing the pressure in the pump discharge line. When it reaches the vertical dotted line position 27, no output of the pump is provided.

Each of the cylinders 20 has a fluid port 28 connected by conduits 30 to stationary direction control valving illustrated schematically by the block 32. As the pump rotates, one half of the cylinders discharge high pressure fluid to a common line in the valve body, while the remaining half are connected to a low pressure fluid return line. From the valving, the fluid is connected to cylinder ports 34 in the block 36 of a variable displacement hydraulic motor unit 38. The motor unit is, essentially, a mirror image of pump unit 18, and has a cylinder block 36 drivably connected to a power output shaft 40. The block has circumferentially spaced cylinders 42, each slidably containing a piston 44. The piston rods slide against a non-rotating swash plate 46 tiltably mounted on the transmission housing, by means not shown. In the full line position shown, swash plate 46 conditions the motor unit for a maximum torque output and fluid displacement, and a minimum speed drive of output shaft 40 by the pump unit 18. Progressively pivoting swash plate 46 to its dotted line vertical position progressively decreases the motor displacement, or destrokes the motor, to cause a corresponding increase in the speed of rotation of shaft 40 in a known manner.

The tilting of the swash plates for both the pump and motor units is accomplished by hydraulic piston type means 48, 50. The supply of fluid for actuating these servos is furnished by a fixed displacement, vane type supercharge or makeup pump 52 driven through reduction gearing 54 by input shaft 10. This pump additionally supplies fluid to the hydrostatic circuit to make up for internal fluid leakage losses during operation, and also to serve as a control pressure, as will be understood more clearly upon consideration of FIGURE. 2.

Output shaft 40 is connected to the vehicle rear wheel drive shaft 12 through a hydraulically actuated clutch 56 and a reduction gearbox 58. A governor unit 60 also is driven by this shaft, for a control purpose to be described.

The valve body 32 controls the supply of high pressure fluid from the pump to one side or the other of motor 38 to provide either a forward or reverse drive of the motor and output shaft 12. During forward drive, the pump and motor fluid ports 28 and 34 are connected so that high pressure fluid from one side of the pump is delivered to the right hand (viewed from input shaft 10) cylinder ports 34 of motor unit 38 to effect a clockwise (arrow 62) rotation of output shafts 40 and 12. The opposite ports of the motor are connected via a low pressure return line through the valving to the low pressure inlet to the pump. Actuating the valve block 32 in a suitable manner, by means to be described, reverses the connections to the ports of motor unit 38 to then cause a counterclockwise rotation of the cylinder block 36, upon clockwise rotation of pump unit 18.

In operation, a neutral, or no-drive, is provided by tilting pump swash plate 26 to its vertical position, thereby terminating any supply of high pressure fluid to the motor unit cylinders. Movement of the swash plate to its maximum inclined position conditions the pump for a maximum output and minimum pressure. Rotation of cylinder block 16 then supplies high pressure fluid to the right side of the motor cylinder block, and begins to rotate output shafts 40 and 12 slowly. Continued progressive movement of motor swash plate 46 towards its vertical position progressively decreases the displacements of its cylinders and the motor torque output, and increases the speed of rotation of shafts 40 and 12, until a maximum speed is reached when swash plate 46 is in its vertical position.

A reverse drive is established by actuating members in valve block 32 to admit high pressure fluid to the left hand side of motor unit 38, thereby causing a counterclockwise or reverse rotation of shafts 40 and 12.

Figure 2:
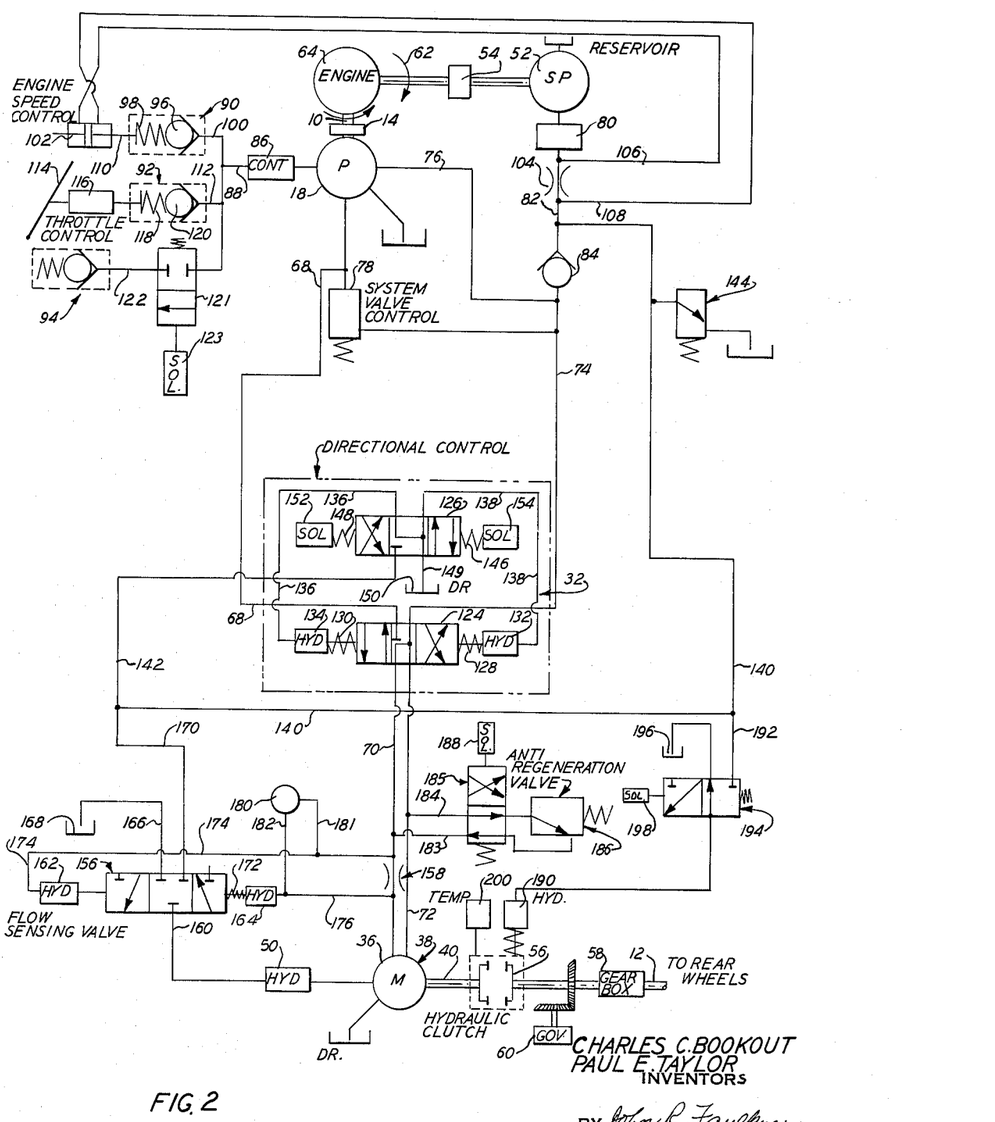
FIGURE 2 illustrates schematically a control system constructed according to the invention; and, FIGURE 3 illustrates schematically the electrical circuits for control of elements of the system of FIGURE 2.

The fluid pressure system for automatically controlling the progressive forward and reverse speed operations is shown in FIGURE 2. This figure shows, schematically, an engine 64 driving pump unit 18 and supercharge pump 52 through reduction gearing 14 and 54. A main high pressure pump discharge line 68 is connected through directional control valving, indicated by the dotted line enclosure 32, to a common line 70. This line leads to one side of cylinder block 36 of motor unit 38. The ports on the opposite side of the motor are connected through a common low pressure or return line 72, through the directional control valving 32, to a line 74 and a branch line 76. Line 76 leads to the low pressure inlet side of the pump 18. Thus, a closed hydraulic circuit is provided for the pump and motor units.

A system pressure relief valve 78 prevents excessive pressure build up in the circuit. It is spring biased to a closed position, in a normal manner, and opens when the circuit pressure exceeds a predetermined high value, such as, for example, 3600 p.s.i.

The internal fluid losses occasioned by the operation of the pump and motor units are replenished by supercharge pump 52 supplying fluid through a filter 80, a line 82 and past a low pressure (5 p.s.i., for example) non-return check valve 84 into pump return line 76.

As stated previously, the pump 18 is of a known variable displacement, pressure compensated type. Its swash plate 26 can be tilted to a particular angle by the hydraulic piston shown in FIGURE 1 to provide a circuit pressure and torque output of the motor adequate to overcome the particular load on the output shaft. For a given engine speed and accelerator pedal depression, tilting the pump swash plate to its maximum inclined position provides the greatest fluid displacement, while establishing the lowest discharge pressure. Destroking or tilting the swash plate towards a vertical position progressively decreases the displacement, while increasing the pressure and torque output. Being pressure compensated, the pump always provides as much fluid flow as is required by the motor 38.

The torque that the motor unit is capable of developing varies with the system pressure. That is, the displacement setting of swash plate 26 controls the maximum pressure and torque delivered to the motor for that particular pump setting. One of the features of the invention is to coordinate the circuit pressure with the changes in engine speed as well as torque demand as indicated by the position of the accelerator pedal, so that the torque output of the motor will always correspond to the particular setting of the accelerator pedal and engine speed.

Assume, for example, that a vehicle is heavily loaded, and stalled, and therefore, will require the maximum torque output of the motor to rotate the rear wheels. In this case, it may require in excess of 3,000 p.s.i. circuit pressure. Accordingly, the operator would depress the accelerator pedal to, or close to, a maximum amount. This increases the engine speed to provide a horsepower input level sufficient to allow the pump to provide a pressure and torque level high enough to do the job. With the system constructed according to the invention, this maximum depression of the accelerator pedal will automatically condition the pump to provide its maximum output pressure, and thereby enable the motor to supply the necessary torque required during these particular conditions of operation.

By means to be described, the pump is stroked automatically to provide a fluid pressure of a certain level in line 68. The motor unit is always stroked to its fullest extent when the motor cylinder block 36 output side is stationary. Therefore, the pressure level of the circuit may or may not now be sufficient to provide the torque to the motor necessary for it to overcome the load on the output shaft. If not, further depression of the accelerator pedal is necessary to stroke the pump until the proper pressure level is reached.

This pump control is designated in FIGURE 2 by the block 86. It contains the piston or servo unit 48 of FIGURE 1 that tilts the swash plate 26. The piston is movable by fluid under pressure in a line 88, and its movement is calibrated to progressively destroke the pump and increase the system pressure as the fluid pressure in line 88 increases. The control 86 also contains the pump pressure compensating mechanism. This mechanism not only always supplies as much flow to the motor as is required, regardless of system pressure, but also is responsive to a minimum flow to destroke the pump to its neutral or non-pumping position. That is, if the pressure in the circuit is insufficient to rotate the stalled motor, as would be the case when the accelerator pedal depression or engine speed is insufficient to provide a high enough torque to overcome the load on the output shaft, flow through the circuit is prevented. This condition activates a destroking mechanism to place the pump swash plate in a non-pumping vertical position, and thereby protect the pump against excessive pressure build up.

To accomplish the functions described, the pressure level of the fluid in line 88 is controlled by any one of three different pressure relief mechanisms 90, 92 and 94. Relief valve mechanism 90 includes a ball 96 biased by a spring 98 to block the open end of a branch 100 of line 88. In the absence of other forces, the spring will prevent opening of the valve below a pressure in line 88 of, say, 200 p.s.i., for example. A hydraulic control 102 at all times controls an additional force on the relief valve 90 to increase the point at which the valve will unseat.

Control 102 is adapted to vary the pressure in line 100, and, therefore circuit pressure, as a function of the changes in engine speed to prevent operation of the system at inadequate or low engine rotational speeds; i.e., it prevents operation of the system before the engine has arrived at a speed capable of sufficiently operating the transmission. For this purpose, control 102 is operated by fluid from supercharge pump 52. An orifice 104 is provided in supercharge line 82, and pressure taps are made on opposite sides of the orifice by means of lines 106 and 108. These pressure taps are connected to opposite portions of the pressure actuating unit 102, which is shown in the form of a differentially operated piston. Unit 102 has an actuating rod 110 connected to the piston and adapted to bear against the base plate of spring 98 to increase the force on ball 96.

The fluid pressure in line 106 acts in a direction to increase the bias on the relief valve spring 98, whereas the lower fluid pressure in line 108 acts in an opposite direction on unit 102. Since the pressure drop across orifice 104 varies in an increasing parabolic manner with the flow through the orifice, with the increase in engine speed, the bias against the spring base will also increase. This is so the system pressure will normally increase as a function of the change in engine speed, as determined by the speed of rotation of supercharge pump 52. However, if the pressure in line 108 downstream of orifice 104 should suddenly rise to a damaging value at the same time that the engine speed is decreasing, the piston in unit 102 will be moved to the left to relieve all the forces on the ball 96 except that due to the spring bias alone. The system pressure, therefore, at this time, would be maintained at a minimum 200 p.s.i. level.

The system pressure level is also controlled in accordance with the degree of depression of the vehicle engine throttle pedal. The line 88 has a parallel branch 112, the pressure in which is controlled by the pressure relief valve 92. This valve has a setting similar to relief valve 90, and normally opens when the system pressure rises above 200 p.s.i. An additional means biases the valve closed with a progressively increasing force upon movement of the throttle control from its closed towards its open position. In this connection, the vehicle engine throttle pedal 114 has a mechanical connection 116 to the base of spring 118 to transmit force applied to the throttle pedal directly to the spring. This force, therefore, progressively increases the closing force on the ball valve 120 with progressive depression of the throttle pedal. Thus, the system pressure will increase in proportion to the increase in torque demand, as evidenced by the setting of the throttle control pedal 114.

From the foregoing, it will be seen, therefore, that the system pressure normally is controlled as a function of both engine speed and throttle pedal position, so that the circuit pressure level will always correspond to whichever pressure relief valve is establishing the lowest pressure.

The system pressure is also controlled automatically in the event of unsafe operating conditions, such as, for example, a signal from the governor 60 that the output shaft speed is above a desired level. In this connection, the line 88 is further controlled by a two-position flow-through valve 121, normally biased to a position completely blocking the exhaust of fluid from 88 to a line 122. This latter line is controlled by the pressure relief valve 94 that is similar to valves 90 and 92, and also opens at 200 p.s.i. pressure in line 122. At a predetermined vehicle speed, in this case 10 m.p.h., a solenoid 123 is energized automatically, by means to be described, to move the valve 121 upwardly against its spring bias, and directly connect lines 88 and 122. The system pressure will then automatically decrease to a 200 p.s.i. level by the unseating of relief valve 94.

Directional control valving 32 includes a three-position pilot control valve 124, and a similar three-position follower, fluid directional control valve 126. The pilot valve controls the distribution of fluid from the supercharge pump 52 to opposite sides of the directional control valve 126. Valve 126 will move in one direction or the other to supply the high pressure fluid from pump 18 to either of motor lines 70 or 72.

Flow directional valve 124 is a three-positional valve, and is normally biased to its center, neutral position by equal force springs 128 and 130 acting on opposite ends of the valve. In the center position, flow from high pressure pump supply line 68 is blocked, and both motor fluid lines 70 and 72 are connected to each other and to the low pressure pump return line 74. This latter line in turn is connected through line 76 to the inlet side of pump 18. Valve 124 is reciprocated to one side or the other by hydraulic piston-type actuators 132 and 134. When actuator 134 is supplied with fluid under pressure from a line 136, valve 124 is moved to the right to its forward drive position to directly connect high pressure supply line 68 and motor line 70, while connecting low pressure return lines 74 and 72. As described previously, clockwise rotation of pump unit 18 will now cause a corresponding clockwise rotation of motor unit 38.

When hydraulic actuator 132 is supplied with fluid under pressure from a line 138, valve 124 will move to the left to its reverse drive position, and reverse the connections between the pump and motor high and low pressure lines. That is, pump high pressure supply line 68 will be directly connected to motor line 72, while the pump return line 74 will be connected to motor line 70. This reversal of ports on the motor unit will then cause the motor to rotate in a direction opposite to the direction of rotation of the pump unit 18, and thereby provide a reverse drive of the output shaft 12 with respect to the rotation of input shaft 10.

The fluid under pressure admitted to either of lines 136 or 138 to move control valve 124 is supplied from supercharge pump 52 through branch lines 140 and 142. The pressure in these lines is maintained at a set maximum value by a pressure relief valve 144 set to open, say, at 125 p.s.i., for example. The selective delivery of fluid from these lines to lines 136 and 138 is in turn controlled by pilot valve 126.

The pilot valve, as stated previously, is a three-positional valve normally centered by springs 146 and 148 acting on opposite ends thereof. In the center position, line 142 is blocked, and pilot lines 136 and 138 are interconnected through a line 149 to a sump 150. The flow directional valve 124 thus remains in its central, neutral position, rendering the transmission inoperative. The pilot valve 126 is moved to the right or left by solenoids 152 and 154, selectively energized by means to be described later. Energization of solenoid 154 moves valve 126 to the left to connect line 142 to line 136, and thereby cause flow control valve 124 to move to the right to its forward speed position. Energization of solenoid 152 and de-energization of solenoid 154 moves pilot valve 126 to the right to reverse the previous connections and supply line 138 with fluid under pressure from line 142. Control valve 124 is thus moved to the left to its reverse drive position. When control valve 124 is in its rightward or forward drive position, the pump and motor units will operate in a manner as described. The pump delivers high pressure fluid to line 70 and to the motor, and low pressure fluid from the motor flows through line 72 and pump return line 76.

The function of the variable displacement motor unit 38, up to a predetermined speed, is to supply full torque to the rear wheels; subsequently, the torque setting of the motor is varied in proportion to the speed changes and throttle pedal setting to provide a constant horsepower to the output shaft. This is accomplished by initially tilting the swash plate of motor unit 38 to provide a maximum torque output until the vehicle rear wheels have reached a speed of approximately 2 m.p.h. If the system pressure, as determined by the engine speed and throttle settings, is sufficient to provide enough torque for the motor to turn, the motor will then slowly begin rotating output shaft 12. When the output shaft speed has reached approximately 2 m.p.h., the motor torque setting is varied automatically to decrease the torque setting in proportion to the speed increase to provide a constant horsepower to the output shaft.

This sequence of operations is controlled by a flow sensing valve 156, controlled by system fluid flow through an orifice 158 in the normally high pressure supply line 70. The piston actuator 50 for motor swash plate 46 (FIGURE 1) normally is biased to a position conditioning the motor for a maximum torque output. Fluid under pressure for tilting the swash plate, and thereby decreasing its displacement, is supplied through a line 160 controlled by the three-position valve 156. This valve is a fluid pressure regulating, closed center type valve. It is moved by hydraulically actuated servos 162 and 164 to a regulating position to alternately connect line 160 through a line 166 to a fluid pressure sump 168, or connect line 160 to fluid under pressure in a line 170. Line 170 is a branch of control line 140 from supercharge pump 52.

Valve 156 is normally biased by a spring 172 to the left to connect line 160 to sump 168, while blocking supply line 170. The valve remains in this position until hydraulic pressure in a line 174 causes actuator 162 to overcome the forces of spring 172 and actuator 164 acting on the spring. The valve 156 then begins moving to the right to progressively meter fluid from supply line 170 to line 160, while alternately closing drain line 166. The valve will hunt back and forth seeking its own pressure level in a known manner, as determined by the pressures against servos 162 and 164, until an equilibrium position is finally reached. At this point, the metered pressure from line 170 acting through line 160 on the swash plate actuator 50 will cause the motor swash plate to be tilted an amount sufficient to decrease the motor torque setting in proportion to the motor speed to provide a constant horsepower to output shaft 40.

The movement of regulator valve 156 is controlled by the pressure drop across orifice 158 in line 70. Lines 174 and 176 are connected to opposite sides of the orifice, line 176 supplying the fluid at downstream pressure to actutor 164. Orifice 158 controls the movement of valve 156 by preventing its regulating movement below a predetermined flow through or pressure drop across it. That is, a pressure drop across orifice 158 of, say, 50 p.s.i., which is indicative of a flow of, say 26 gallons per minute, indicates in general, a certain rotative condition of operation of motor 38. In this case, the output shaft rotating at approximately 2 m.p.h. will increase the pressure drop above 50 p.s.i. The motor, therefore, is ready to be destroked so that a constant horsepower to the output shaft will be provided. When this pressure drop condition occurs, the pressure in line 174 is sufficient to overcome the forces of spring 172 and the lower pressure force exerted by actuator 164 to begin the regulating movement of valve 156. This movement of the valve then begins to supply line 160 with fluid, and starts destroking the motor to decrease its torque setting in proportion to its speed increase to thereby maintain a constant horsepower to the output shaft 40.

Destroking of motor 38 not only decreases the torque setting, but also increases the motor back pressure. The back pressure decreases the pressure drop across orifice 158, and thereby causes valve 156 to be moved to connect more of line 160 to sump 168. This increases the stroke of the motor, again causing a slight rise in the pressure drop across orifice 158, to again move valve 156 to the right. This back and forth regulating movement of valve 160 will continue until an equilibrium position is reached for the particular speed of the motor unit 38. Valve 156 will, therefore, progressively move to the right in proportion to the change in the pressure drop and flow across orifice 158, as influenced by the increase in speed of the output shaft.

Since the system or circuit pressure is determined by the throttle control and engine speed control, the torque setting of the motor unit 38 will, therefore, vary as a function of this circuit pressure.

In operation, therefore, when the motor unit is stationary, its swash plate is in a position to provide maximum displacement and maximum torque output. The pressure on opposite sides of orifice 158 will be equal, since no flow is occurring through the motor. Valve 156 will be moved by spring 172 to a position to the left of that shown, connecting line 160 to sump 168. The motor is now stroked for a maximum displacement. As the motor begins rotating, a pressure differential across orifice 158 will begin building up until the maximum permissive drop, 50 p.s.i., is obtained; at which point the flow sensing valve will have moved to the right past the position shown to begin regulating by feeding fluid under pressure into line 160 to begin to destroke motor 38. Therefore, up to approximately 2 m.p.h. output shaft speed, the motor unit has a constant torque setting; above 2 m.p.h., the torque setting is varied in proportion to the speed increase to provide a constant horsepower to the output shaft.

In the event that orifice 158 should become clogged, or the pressure upstream of the orifice should rise suddenly to a dangerous level, means are provided for interconnecting the fluid supply and return lines and venting the system pressure to the sump. That is, the hydrostatic control circuit is neutralized, or in a fluid bypass condition. A pressure differential responsive actuator 180 is exposed on opposite sides by lines 181 and 182 to the pressures upstream and downstream of orifice 158. The unit is operable at a maximum differential of, say 100 p.s.i., at which point it de-energizes the electrical circuit, in a manner to be described, and centers the pilot and direction control valves 126 and 124, and connects lines 70 and 72 to the pump return line 74.

The invention provides a further feature of preventing damage to the system, and to pump 18, should the rear wheels overspeed below 10 m.p.h. Both lines 70 and 72, connected to motor unit 38, have branch connections 183 and 184. These lines are connected through a two-positional valve 185 to opposite sides of a spring biased pressure relief valve 186. This latter valve opens at 200 p.s.i. to interconnect lines 183 and 184, and thereby reduce the system pressure to that level. During forward speed operation, should the motor overspeed, it attempts to become a pump; and the line 72, which is normally the low pressure return line, becomes the high pressure line, and line 70 the low pressure line. The valve 185 is shown in the position it attains when directional control valve 124 is in its forward drive position. In this position, and at this time when the motor attempts to drive pump 18, valve 185 permits relief valve 186 to unload line 184 above 200 p.s.i. pressure level, and prevent drive of the pump.

To permit establishment of a reverse drive of the motor, when lines 68 and 72 are connected, valve 185 is movable by a solenoid 188 to reverse the connections of lines 183 and 184 to opposite sides of the pressure relief valve 186. Overrun or overspeed of the motor during reverse operation is, therefore, ineffective to drive pump 18. This is due to the relief of line 70 through the pressure relief valve 186 above a pressure level of 200 p.s.i.

It should be remembered that the governor 60, in this particular embodiment, also causes the system pressure to be lowered when the vehicle speed has reached 10 m.p.h., by moving valve 121 to connect lines 88 and 122. It will be clear, of course, that this control could be omitted if desired, or a higher or lower governor setting could be made, if desired.

The fluid in line 140 from supercharge pump 52 is also used as a control for the hydraulic clutch 56 between the motor 38 and gear box 58. As stated previously, clutch 56 is of a known spring released type. It is engaged by fluid under pressure applied to a piston type actuator 190. Supercharge pump pressure in a branch line 192 is connected to actuator 190 through a two-position, electrically controlled valve 194. This valve is spring biased to the position shown to block line 192 and connect fluid acting against actuator 190 to a sump 196. Energization of a solenoid 198 moves valve 194 to the right to connect line 192 and actuator 190, and thereby engage clutch 56.

A temperature responsive mechanism 200 is also connected to clutch 56 to disengage the clutch above a predetermined temperature, which is indicative of a harmful condition of operation. This latter mechanism also is controlled electrically, in a manner to be described; when operative, it reduces the system pressure to a level of 200 p.s.i., and returns all the control valves to their neutral positions.

Figure 3:
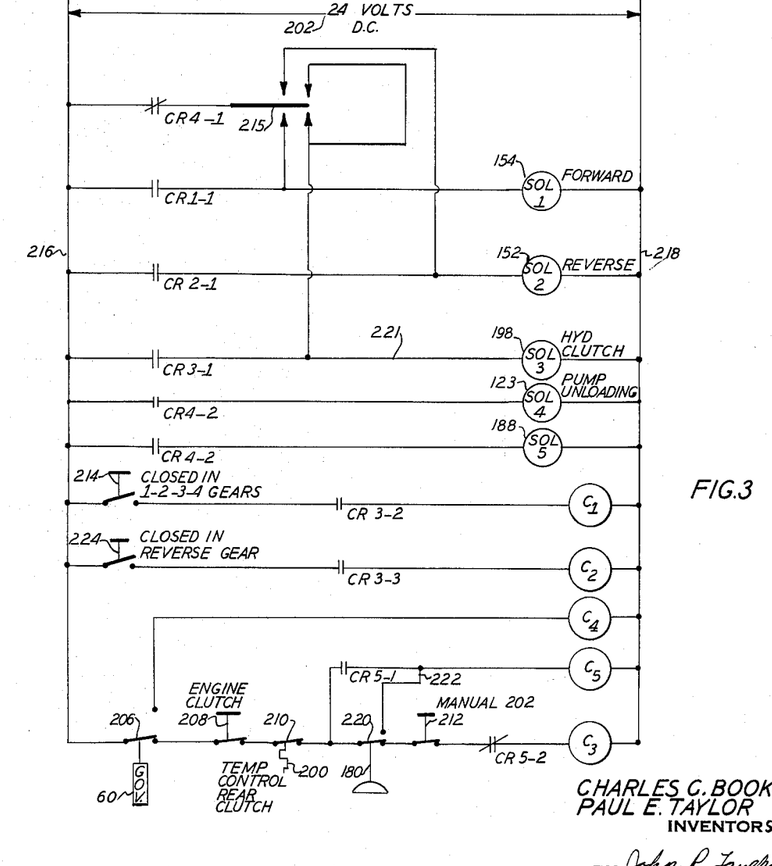

The electrical circuit for automatically controlling the operation of the pilot valve 126; the hydraulic clutch control valve 194; the system overload relief valve 121; the pressure differential switch 180 for flow sensing valve 156; the anti-regeneration valve 185; and the clutch temperature responsive mechanism 200; is shown in FIGURE 3. This circuit includes a source of electrical energy, which, in this case, is provided by a 24 volt D.C. battery 202. The various control solenoids 154, 152, 198, 123, and 188 are represented by the circles numbered, respectively, 1, 2, 3, 4 and 5. These solenoids are controlled by relay coils labelled, respectively, $C_1$, $C_2$, $C_3$, $C_4$, and $C_5$. Also, the switches for these relays are labelled, respectively, CR1–1, CR2–1, CR2–2, CR3–1, CR3–2, CR3–3, CR4–1, CR4–2, CR5–1 and CR5–2.

The circuit is designed so that a number of conditions must be met before the control system will function; namely, the governor 60 has a switch 206 that must be closed; the main engine clutch has a switch 208 that must be closed; the temperature control 200 for clutch 56 must be below a predetermined level to close a switch 210; the pressure differential switch 180, for flow sensing valve 156 must be closed; and a manually operated switch 212 must be closed. A manually operated emergency override two-throw toggle or key 215, having reverse and forward contacts, and a neutral position is also provided, in the case of malfunction or damage to the automatic switching system.

The circuit will be best understood by considering the various operational phases.

When the operator decides that the rear power unit, controlled by the hydrostatic control system of FIGURE 2, is to be operative, the manual switch 212 is closed. With the rear wheels stationary, governor switch 206 is in the position shown, and the engine clutch switch 208, temperature control switch 210, differential switch 180, and a switch 214 are all closed. This latter switch is closed automatically when the transmission gearshift lever is positioned in forward drive position. Accordingly, current from battery 202 flows through a line 216, through the closed switches 206, 208, 210, 220, 212, and through normally closed CR5–2, to coil $C_3$, and to the ground side of the battery through a return line 218. Coil $C_3$ closes normally open CR3–1, CR3–2, CR3–3, thus completing the circuit through a line 221 to solenoid 3, and supplying current to coil $C_1$. The hydraulic clutch control valve 194 (FIGURE 2) is thereby moved to the right of the position shown to engage clutch 56. Simultaneously, current through coil $C_1$ closes CR1–1 to energize solenoid 1 (154), and thereby move pilot valve 126 to its forward drive position. This permits fluid under pressure in lines 142 and 136 to move the directional control valve 124 to the right, and thereby connect the pump and motor high and low pressure lines 68, 70 and 74, 72. The hydrostatic transmission is now conditioned for forward drive operation.

The remaining portions of the circuit shown in FIGURE 3 are inoperative at this time due to the normally open positions of the various relay switches. If the engine clutch switch 208 is disengaged, or the temperature of the clutch 56 becomes excessive, or the pressure switch 180 becomes operative, the circuit will be broken by opening of switches 208, 210 or 220, resulting in a return of the valve elements to their neutral positions to render the control system inoperative.

When the rear wheels attain a speed of 10 m.p.h., the governor switch 206 moves to break the circuit to coil $C_3$ and supply current to coil $C_4$. This de-energizes solenoid 3 (198) to effect a disengagement of the hydraulic clutch 56 by its spring. Simultaneously, current through coil $C_4$, opens CR4–1 and closes CR4–2. The former breaks the circuit to the emergency override toggle 214, while the latter energizes the solenoid 4 (120) to move valve 121 and connect system pressure lines 88 and 122 to reduce the system pressure to 200 p.s.i. by means of relief valve 94. The front pump 18, is therefore, unloaded, and the drive to the rear wheels is broken.

In the event pressure switch 180 becomes activated, the throw member of switch 220 moves to break the circuit to coil $C_3$, while energizing the circuit to coil $C_5$ through a line 222. Current through coil $C_5$ closes normally open CR5–1 and opens normally closed CR5–2. The clutch control valve 194 then moves to effect a disengagement of clutch 56. The system, however, remains operative, so that when the excessive pressure drop across orifice 158 is relieved, the system will automatically be ready to function again in a normal manner.

For a reverse drive, a switch 224 is closed by the operator transmission gearshift lever, which also opens switch 214. The open condition of this latter switch breaks the circuit to coil $C_1$ and, therefore, pilot valve solenoid 1 (154), allowing the pilot valve 126 to return to its central position. This latter position interrupts the fluid pressure to the flow control valve actuator 134, permitting vale 124 to assume its central position and interconnect motor lines 70 and 72 to the low pressure pump inlet line 76. The closing of the reverse switch 224 now supplies coil $C_2$ with current to close normally open CR2–1 and CR2–2, to energize both pilot valve and the anti-regeneration valve solenoids 2 (152) and 5 (188). Anti-regeneration valve 185 is now moved to reverse the connections of lines 183 and 184 to pressure relief valve 186, and prevent driving of pump 18 upon overrun of motor 38 in a reverse direction. Simultaneously, energization of pilot valve solenoid 2 (152) moves pilot valve 126 to the right to supply fluid under pressure from line 142 to line 138 to move actuator 132 and control valve 124 to the left. This connects high pressure pump supply line 68 to motor line 72, and motor line 70 to the pressure pump inlet line 74. The transmission is now conditioned for a reverse drive operation, and will remain in this condition as long as the safety features provided by the various controls described remain closed. The flow sensing valve 156 will remain in its left hand position at all times during reverse operation due to the higher pressure in line 176. The motor thus remains stroked for its maximum torque output during reverse drive.

From the foregoing, it will be seen that the invention provides a control system for a hydrostatic transmission that is completely automatic in operation once the driver-operated manual switch is placed in condition to render the system operative, and the transmission lever is moved to its forward or reverse drive position. It will also be seen that the control system has a plurality of safety devices to prevent damage to the transmission under unusual conditions of operation. Furthermore, it will be seen that the transmission automatically adjusts the torque setting of the motor to a constant value below approximately a 2 m.p.h. output shaft speed, and automatically varies the torque setting above 2 m.p.h. and below 10 m.p.h. to provide constant horsepower to the output shaft. Above this speed, the system is automatically rendered inoperative.

While the invention has been illustrated in its preferred embodiment, it will be clear to those skilled in the arts to which the invention pertains, that many changes and modifications may be made thereto without departing from the scope of the invention.

We claim:

1. A transmission comprising power input and output shafts, and means connecting said shafts for an infinitely variable drive therebetween, said means comprising variable displacement hydrostatic fluid pump and motor units fluid connected in a closed hydraulic circuit to effect rotation of said motor unit by fluid under pressure from said pump unit, said units being connected respectively to said input and output shafts, movable means including fluid pressure operated servo means operably connected to said units to vary the fluid displacements thereof and thereby vary the drive between said shafts, a source of fluid for each of said servo means, conduit means connecting said fluid to said motor unit servo means, flow restricting means in said circuit between said units providing a pressure drop across said latter means, and fluid pressure actuated valve means in said conduit means controlling the flow of fluid to said motor unit servo means, said valve means being acted upon and variably moved in opposite directions by fluid under pressure in said circuit on opposite sides of said flow restriction means, a change in the pressure drop across said restricting means in response to rotation of said motor unit above a predetermined speed moving said valve means to vary the supply of fluid to said motor unit servo means to vary the fluid displacement of said motor unit and provide a constant power to said output shaft.

2. A transmission comprising power input and output shafts, and means connecting said shafts for an infinitely variable drive therebetween, said means comprising variable displacement hydrostatic fluid pump and motor units fluid connected in a closed hydraulic circuit to effect rotation of said motor unit by fluid under pressure from said pump unit, said units being connected respectively to said input and output shafts, movable means including fluid pressure operated servo means operably connected to said units to vary the fluid displacements thereof and thereby vary the drive between said shafts, a source of fluid for each of said servo means, conduit means connecting said fluid to said motor unit servo means, flow restricting means in said circuit between said units providing a pressure drop across said means, and fluid pressure actuated valve means in said conduit means between said units controlling the flow of fluid to said motor unit servo means, said valve means being acted upon and variably moved in opposite directions by fluid under pressure in said circuit on opposite sides of said flow restriction means, a predetermined change in the pressure drop across said restricting means in response to a predetermined speed of rotation of said motor unit moving said valve means to vary the supply of fluid to said motor unit servo means to vary the fluid displacement and torque output of said motor unit to provide a constant power to said output shaft.

3. A transmission comprising power input and output shafts, and means connecting said shafts for an infinitely variable drive therebetween, said means comprising variable displacement hydrostatic fluid pump and motor units fluid connected in a closed hydraulic circuit to effect rotation of said motor unit by fluid under pressure from said pump unit, said units being connected respectively to said input and output shafts, movable means including fluid pressure operated servo means operably connected to said units to vary the fluid displacements thereof and thereby vary the drive between said shafts, a source of fluid for said motor unit servo means, the motor unit movable means including means initially conditioning said motor unit for maximum torque output to said output shaft, flow restricting means in said circuit between said units providing a pressure drop across said means, and fluid pressure actuated valve means in said conduit means between said units controlling flow of fluid to said motor unit servo means to vary the torque output of said motor unit, said valve means being acted upon and variably moved in opposite directions by fluid under pressure in said circuit on opposite sides of said flow restriction means, an increase in the pressure drop across said restricting means above a predetermined value in response to a predetermined increase in rotation of said motor unit moving said valve means to control the supply of fluid to said motor unit servo means to vary the fluid displacement of said motor unit and torque output in proportion to the increase in speed of said unit to provide a constant power to said output shaft.

4. A transmission for a motor vehicle having an engine controlled by an operator-controlled throttle pedal, comprising, power input and output shafts, and means connecting said shafts for an infinitely variable drive therebetween, said means comprising variable displacement hydrostatic fluid pump and motor units fluid connected in a closed hydraulic circuit to effect rotation of said motor unit by fluid under pressure from said pump unit, means connecting said units respectively to said input and output shafts, movable means including fluid pressure operated servo means connected to said units to vary the fluid displacements thereof and thereby vary the drive between said shafts, a source of fluid for each of said servo means, conduit means connecting said fluid to said servo means, and means for controlling the pressure of the fluid in said circuit and the torque output of said motor unit as a function of the change in position of said throttle pedal from open to closed throttle positions, said latter means comprising a relief valve in said circuit establishing a minimum operating pressure therein and means connecting said throttle pedal and said relief valve for increasing the resistance to opening of said relief valve in proportion to the throttle opening movement of said pedal to permit a proportionate increase in the pressure of the fluid in said circuit.

5. A transmission for a motor vehicle having an engine controlled by an operator-controlled throttle pedal, comprising, power input and output shafts, and means connecting said shafts for an infinitely variable drive therebetween, said means comprising variable displacement hydrostatic fluid pump and motor units fluid connected in a closed hydraulic circuit to effect rotation of said motor unit by fluid under pressure from said pump unit, means connecting said units respectively to said input and output shafts, movable means including fluid pressure operated servo means connected to said units to vary the fluid displacements thereof and thereby vary the drive between said shafts, a source of fluid for each of said servo means, conduit means connecting said fluid to said servo means, means for controlling the pressure of the fluid in said circuit and the torque output of said motor unit as a function of the change in position of said throttle pedal from open to closed throttle positions, said latter means comprising a relief valve in said circuit establishing a minimum operating pressure therein, means connecting said throttle pedal and said relief valve for increasing the resistance to opening of said relief valve in proportion to the throttle opening movement of said pedal to permit a proportionate increase in the pressure of the fluid in said circuit, and fluid pressure actuated valve means in said conduit means controlling the flow of fluid to said motor unit servo means and acted upon and variably moved by a change in the pressure of the fluid in said circuit in response to increase in rotation of said motor unit above a predetermined speed for moving said motor unit movable means to decrease the fluid displacement of said motor unit and provide a constant power to said output shaft, the torque output of said motor unit being scheduled as a function of the position of said throttle pedal.

6. A transmission for a motor vehicle having an engine, comprising, power input and output shafts, and means connecting said shafts for an infinitely variable drive therebetween, said means comprising variable displacement hydrostatic fluid pump and motor units fluid connected in a closed hydraulic circuit to effect rotation of said motor unit by fluid under pressure from said pump unit, said units being connected respectively to said input and output shafts, movable means including fluid pressure operated servo means connected to said units to vary the fluid displacements thereof and thereby vary the drive between said shafts, an engine driven supercharge pump providing a source of fluid for each of said servo means, conduit means connecting said fluid to said servo means, flow restriction means in said conduit means providing a pressure drop thereacross, and means for controlling the pressure of the fluid in said circuit and the torque output of said motor unit as a function of the change in the pressure of the fluid on opposite sides of said flow restriction means, said latter means comprising a relief valve in said circuit establishing a circuit minimum operating pressure, fluid pressure actuated means adapted to act on said relief valve for increasing the resistance to opening of said valve to permit an increase in the pressure in said circuit, said latter means having portions acted upon by fluid under pressure from opposite sides of said flow restricting means for moving said latter means in opposie directions to increase or decrease said circuit pressure in accordance with the more dominant of changes in engine speed or the pressure of the fluid downstream of said flow restricting means.

7. A transmission for a motor vehicle having an engine, comprising, power input and output shafts, and means connecting said shafts for an infinitely variable drive therebetween, said means comprising variable displacement hydrostatic fluid pump and motor units fluid connected in a closed hydraulic circuit to effect rotation of said motor unit by fluid under pressure from said pump unit, said units being connected respectively to said input and output shafts, movable means including fluid pressure operated servo means connected to said units to vary the fluid displacements thereof and thereby vary the drive between said shafts, an engine driven supercharge pressure pump providing a source of fluid for one of said servo means, conduit means connecting said fluid to said servo means, flow restriction means in said conduit means providing a pressure drop thereacross, means for controlling the pressure of the fluid in said circuit and the torque output of said motor unit as a function of the change in the pressure of the fluid on opposite sides of said flow restriction means, said latter means comprising a relief valve in said circuit establishing a minimum operating pressure in said circuit, fluid pressure actuated means adapted to act on said relief valve for increasing the resistance to opening of said valve to permit an increase in the pressure in said circuit, said latter means having portions acted upon by fluid under pressure from opposite sides of said flow restricting means for moving said latter means in opposite directions to increase or decrease said circuit pressure in accordance with the more dominant of changes in engine speed or the pressure of the fluid downstream of said flow restricting means, and fluid pressure actuated valve means in said conduit means between said units controlling the flow of fluid to said motor unit servo means and acted upon and variably moved by a change in the pressure of the fluid in said circuit in response to increase in rotation of said motor unit above a predetermined speed for moving said motor unit movable means to decrease the fluid displacement of said motor unit and provide a constant power to said output shaft, the torque output of said motor unit being scheduled as a function of the change in circuit pressure.

8. A transmission for a motor vehicle having an engine controlled by an operator-controlled throttle pedal, comprising, power input and output shafts, and means connecting said shafts for an infinitely variable drive therebetween, said means comprising variable displacement hydrostatic fluid pump and motor units fluid connected in a closed hydraulic circuit to effect rotation of said motor unit by fluid under pressure from said pump unit, means connecting said units respectively to said input and output shafts, movable means including fluid pressure operated servo means connected to said units to vary the fluid displacements thereof and thereby vary the drive between said shafts, an engine driven supercharge pressure pump providing a source of fluid for one of said srvo means, conduit means connecting said fluid to said servo means, means for controlling the pressure of the fluid in said circuit and the torque output of said motor unit as a function of the change is position of said throttle pedal from open to closed throttle positions, said latter means comprising a relief valve in said circuit establishing one operating pressure level therein, means connecting said throttle pedal and said relief valve for increasing the resistenance to opening of said relief valve in proportion to the throttle opening movement of said pedal to permit a proportionate increase in the pressure of the fluid in said circuit, flow restriction means in said conduit means downstream of said supercharge pump providing a pressure drop thereacross, additional means for controlling the pressure of the fluid in said circuit as a function of the change in the pressure of the fluid on opposite sides of said flow restriction means, said latter means comprising a second relief valve in said circuit establishing another operating pressure level in said circuit, and fluid pressure actuated means adapted to act on said second relief valve for increasing the resistance to opening of said second valve to permit an increase in the pressure in said circuit, said latter means having portions acted upon by fluid under pressure from opposite sides of said flow restricting means for moving said latter means in opposite directions to increase or decrease said circuit pressure in accordance with the more dominant of changes in engine speed or the pressure of the fluid downstream of said flow restricting means, the circuit pressure level at all lished by said relief valves.

9. A transmission for a motor vehicle having an engine controlled by an operator-controlled throttle pedal, comprising, power input and output shafts, and means connecting said shafts for an infinitely variable drive therebetween, said means comprising variable displacement hydrostatic fluid pump and motor units fluid connected in a closed hydraulic circuit to effect rotation of said motor unit by fluid under pressure from said pump unit, means connecting said units respectively to said input and output shafts, movable means including fluid pressure operated servo means connected to said units to vary the fluid displacements thereof and thereby vary the drive between said shafts, an engine driven supercharge pressure pump providing a source of fluid for one of said servo means, conduit means connecting said fluid to said servo means, means for controlling the pressure of the fluid in said circuit and the torque output of said motor unit as a function of the change in position of said throttle pedal from open to closed throttle positions, said latter means comprising a relief valve in said circuit establishing one operating pressure level therein, means connecting said throttle pedal and said relief valve for increasing the resistance to opening of said relief valve in proportion to the throttle opening movement of said pedal to permit a proportionate increase in the pressure of the fluid in said circuit, flow restriction means in said conduit means downstream of said supercharge pump providing a pressure drop thereacross, additional means for controlling the pressure of the fluid in said circuit as a function of the change in the pressure of the fluid on opposite sides of said flow restriction means, said latter means comprising a second relief valve in said circuit establishing another operating pressure level in said circuit, and fluid pressure actuated means adapted to act on said second relief valve for increasing the resistance to opening of said second valve to permit an increase in the pressure in said circuit, said latter means having portions acted upon by fluid under pressure from opposite sides of said flow restricting means for moving said latter means in opposite directions to increase or decrease said circuit pressure in accordance with the more dominant of changes in engine speed or the pressure of the fluid downstream of said flow restricting means, and fluid pressure actuated valve means in said conduit means controlling the flow of fluid to said motor unit servo means and acted upon and variably moved by a change in the pressure of the fluid in said circuit in response to increase in rotation of said motor unit above a predetermined speed for moving said motor unit movable means to decrease the fluid displacement of said motor unit and provide a constant power to said output shaft, the torque output of said motor unit being scheduled as a function of the circuit pressure level, the circuit pressure level at all times corresponding to the lowest pressure level established by said relief valves.

10. A transmission for a motor vehicle having an engine controlled by an operator-controlled throttle pedal, comprising, power input and output shafts, and means connecting said shafts for an infinitely variable drive therebetween, said means comprising a pair of variable displacement hydrostatic fluid units fluid connected in a closed hydraulic circuit to effect rotation of one of said units by fluid under pressure from the other, means connecting said units respectively to said input and output shafts, movable means including fluid pressure operated servo means connected to said units to vary the fluid displacements thereof and thereby vary the drive between said shafts, a source of fluid for each of said servo means, conduit means connecting said fluid to said servo means, and means for controlling the pressure of the fluid in said circuit and the torque output of one of said units as a function of the change in position of said throttle pedal from open to closed throttle positions, said latter means comprising first means in said circuit establishing a minimum operating pressure therein and second means connecting said throttle pedal and said first means for increasing the pressure of the fluid in said circuit in proportion to the throttle opening movement of said pedal.

11. A transmission for a motor vehicle having an engine controlled by an operator-controlled throttle pedal, comprising, power input and output shafts, and means connecting said shafts for an infinitely variable drive therebetween, said means comprising variable displacement hydrostatic fluid pump and motor units fluid connected in a closed hydraulic circuit to effect rotation of said motor unit by fluid under pressure from said pump unit, means connecting said units respectively to said input and output shafts, movable means including fluid pressure operated servo means connected to said units to vary the fluid displacements thereof and thereby vary the drive between said shafts, a source of fluid for each of said servo means, conduit means connecting said fluid to said servo means, means for controlling the pressure of the fluid in said circuit and the torque output of said motor unit as a function of the change in position of said throttle pedal from open to closed throttle position, said latter means comprising a first means in said circuit establishing a minimum operating pressure therein, second means connecting said throttle pedal and said first means for increasing the pressure of the fluid in said circuit in proportion to the throttle opening movement of said pedal, and fluid pressure actuated valve means in said conduit means controlling the flow of fluid to said motor unit servo means and acted upon and variably moved by a change in the pressure of the fluid in said circuit in response to increase in rotation of said motor unit above a predetermined speed for moving said motor unit movable means to decrease the fluid displacement of said motor unit and provide a constant power to said output shaft, the torque output of said motor unit being scheduled as a function of the position of said throttle pedal.

12. A transmission for a motor vehicle having an engine, comprising, power input and output shafts, and means connecting said shafts for an infinitely variable drive therebetween, said means comprising variable displacement hydrostatic fluid pump and motor units fluid connected in a closed hydraulic circuit to effect rotation of said motor unit by fluid under pressure from said pump unit, said units being connected respectively to said input and output shafts, movable means including fluid pressure operated servo means connected to said units to vary the fluid displacements thereof and thereby vary the drive between said shafts, an engine driven means providing a source of fluid for each of said servo means, conduit means connecting said fluid to said servo means, flow restriction means in said conduit means providing a pressure drop thereacross, and means for controlling the pressure of the fluid in said circuit and the torque output of said motor unit as a function of the change in the pressure of the fluid on opposite sides of said flow restriction means, said latter means comprising first means in said circuit establishing a circuit minimum operating pressure, fluid pressure actuated means adapted to act on said first means for increasing the pressure in said circuit, said latter fluid pressure actuated means having portions acted upon by fluid under pressure from opposite sides of said flow restricting means for moving said latter means in opposite directions to increase or decrease said circuit pressure in accordance with the more dominant of changes in engine speed or the pressure of the fluid downstream of said flow restricting means.

13. A transmission for a motor vehicle having an engine, comprising, power input and output shafts, and means connecting said shafts for an infinitely variable drive therebetween, said means comprising variable displacement hydrostatic fluid pump and motor units fluid connected in a closed hydraulic circuit to effect rotation of said motor unit by fluid under pressure from said pump unit, said units being connected respectively to said input and output shafts, movable means including fluid pressure operated servo means connected to said units to vary the fluid displacements thereof and thereby vary the drive between said shafts, an engine driven supercharge pressure pump providing a source of fluid for one of said servo means, conduit means connecting said fluid to said servo means, flow restriction means in said conduit means providing a pressure drop thereacross, means for controlling the pressure of the fluid in said circuit and the torque output of said motor unit as a function of the change in the pressure of the fluid on opposite sides of said flow restriction means, said latter means comprising first means in said circuit establishing a minimum operating pressure in said circuit, second fluid pressure actuated means adapted to act on said first means for increasing the pressure in said circuit, said second means having portions acted upon by fluid under pressure from opposite sides of said flow restricting means for moving said second means in opposite directions to increase or decrease said circuit pressure in accordance with the more dominant of changes in engine speed or the pressure of the fluid downstream of said flow restricting means, and fluid pressure actuated valve means in said conduit means between said units controlling the flow of fluid to said one servo means and acted upon and variably moved by a change in the pressure of the fluid in said circuit in response to increase in rotation of said motor unit above a predetermined speed for moving said motor unit movable means to decrease the fluid displacement of said motor unit and provide a constant power to said output shaft, the torque output of said motor unit being scheduled as a function of the change in circuit pressure.

14. A transmission for a motor vehicle having an engine controlled by an operator-controlled throttle pedal, comprising, power input and output shafts, and means connecting said shafts for an infinitely variable drive therebetween, said means comprising variable displacement hydrostatic fluid pump and motor units fluid connected in a closed hydraulic circuit to effect rotation of said motor unit by fluid under pressure from said pump unit, means connecting said units respectively to said input and output shafts, movable means including fluid pressure operated servo means connected to said units to vary the fluid displacements thereof and thereby vary the drive between said shafts, an engine driven supercharge pressure pump providing a source of fluid for one of said servo means, conduit means connecting said fluid to said servo means, means for controlling the pressure of the fluid in said circuit and the torque output of said motor unit as a function of the change in position of said throttle pedal from open to closed throttle positions, said latter means comprising first and second means in parallel in said circuit establishing one operating pressure level therein, means connecting said throttle pedal and said first means for increasing the pressure of the fluid in said circuit in proportion to the throttle opening movement of said pedal, flow restriction means in said conduit means downstream of said supercharge pump providing a pressure drop thereacross, additional means for controlling the pressure of the fluid in said circuit as a function of the change in the pressure of the fluid on opposite sides of said flow restriction means to establish another operating pressure level in said circuit, said additional means comprising fluid pressure actuated means adapted to act on said second means, said additional means having portions acted upon by fluid under pressure from opposite sides of said flow restricting means for moving said latter means in opposite directions to increase or decrease said circuit pressure in accordance with the more dominant of changes in engine speed or the pressure of the fluid downstream of said flow restricting means, the circuit pressure level at all times corresponding to the lowest pressure level established by said first and second means.

15. A transmission for a motor vehicle having an engine controlled by an operator-controlled throttle pedal, comprising, power input and output shafts, and means connecting said shafts for an infinitely variable drive therebetween, said means comprising variable displacement hydrostatic fluid pump and motor units fluid connected in a closed hydraulic circuit to effect rotation of said motor unit by fluid under pressure from said pump unit, means connecting said units respectively to said input and output shafts, movable means including fluid pressure operated servo means connected to said units to vary the fluid displacements thereof and thereby vary the drive between said shafts, an engine driven supercharge pressure pump providing a source of fluid for one of said servo means, conduit means connecting said fluid to said one servo means, means for controlling the pressure of the fluid in said circuit and the torque output of said motor unit as a function of the change in position of said throttle pedal from open to closed throttle positions, said latter means comprising first and second means in said circuit establishing one operating pressure level therein, means connecting said throttle pedal and said first means for increasing the pressure of the fluid in said circuit in proportion to the throttle opening movement of said pedal, flow restriction means in said conduit means downstream of said supercharge pump providing a pressure drop thereacross, additional means for controlling the pressure of the fluid in said circuit as a function of the change in the pressure of the fluid on opposite sides of said flow restriction means to establish another operating pressure level in said circuit, said additional means comprising fluid pressure actuated means adapted to act on said second means for increasing the pressure in said circuit, said additional means having portions acted upon by fluid under pressure from opposite sides of said flow restricting means for moving said additional means in opposite directions to increase or decrease said circuit pressure in accordance with the more dominant of changes in engine speed or the pressure of the fluid downstream of said flow restricting means, and fluid pressure actuated valve means in said conduit means controlling the flow of fluid to said one servo means and acted upon and variably moved by a change in the pressure of the fluid in said circuit in response to increase in rotation of said motor unit above a predetermined speed for moving said motor unit movable means to decrease the fluid displacement of said motor unit and provide a constant power to said output shaft, the torque output of said motor unit being scheduled as a function of the circuit pressure level, the circuit pressure level at all times corresponding to the lowest pressure level established by said first and second means.

References Cited by the Examiner

UNITED STATES PATENTS

| | | | |
|---|---|---|---|
| 2,161,439 | 6/1939 | Thoma | 60—53 |
| 2,232,428 | 2/1941 | Benedek | 60—53 |
| 2,254,319 | 9/1941 | Rose | 60—53 |
| 2,774,436 | 12/1956 | Ferris | 60—19 |
| 2,941,365 | 6/1960 | Carlson et al. | 60—19 |
| 3,180,080 | 4/1965 | Budzich et al. | 60—19 |

FOREIGN PATENTS 824,279  11/1959  Great Britain.

EDGAR W. GEOGHEGAN, *Primary Examiner.*

SAMUEL LEVINE, *Examiner.*